US012634550B2

(12) United States Patent
Panje et al.

(10) Patent No.: US 12,634,550 B2
(45) Date of Patent: May 19, 2026

(54) VIDEO SYSTEM

(71) Applicant: ARRIS Enterprises LLC, Suwanee, GA (US)

(72) Inventors: Krishna Prasad Panje, Karnataka (IN); Lakshmi Arunkumar, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 115 days.

(21) Appl. No.: 17/708,465

(22) Filed: Mar. 30, 2022

(65) Prior Publication Data

US 2022/0321946 A1 Oct. 6, 2022

Related U.S. Application Data

(60) Provisional application No. 63/169,626, filed on Apr. 1, 2021, provisional application No. 63/168,502, filed on Mar. 31, 2021, provisional application No. 63/168,488, filed on Mar. 31, 2021, provisional application No. 63/168,496, filed on Mar. 31, 2021.

(51) Int. Cl.
| | |
|---|---|
| *H04N 21/431* | (2011.01) |
| *G11B 27/00* | (2006.01) |
| *H04N 21/435* | (2011.01) |
| *H04N 21/472* | (2011.01) |

(52) U.S. Cl.
CPC ....... *H04N 21/4318* (2013.01); *G11B 27/005* (2013.01); *H04N 21/435* (2013.01); *H04N 21/47217* (2013.01)

(58) Field of Classification Search
None
See application file for complete search history.

(56) References Cited

U.S. PATENT DOCUMENTS

| | | | | | |
|---|---|---|---|---|---|
| 2007/0086669 | A1* | 4/2007 | Berger | ............... | G06V 10/235 |
| | | | | | 382/243 |
| 2015/0326951 | A1* | 11/2015 | Strein | ................ | H04N 21/812 |
| | | | | | 725/32 |
| 2016/0119691 | A1* | 4/2016 | Accardo | ............. | H04N 21/233 |
| | | | | | 725/18 |
| 2016/0127679 | A1* | 5/2016 | Farré Guiu | ........... | H04N 19/40 |
| | | | | | 348/441 |
| 2016/0249079 | A1* | 8/2016 | Malone | ......... | H04N 21/234309 |
| 2021/0409734 | A1* | 12/2021 | Petajan | .............. | H04N 21/435 |

* cited by examiner

*Primary Examiner* — Heather R Jones
(74) *Attorney, Agent, or Firm* — Chernoff, Vilhauer, McClung & Stenzel, LLP

(57) ABSTRACT

A video system that in one embodiment include a system for modifying a video stream that includes a player receiving a video stream in the form of a series of video files. The player receives meta-data comprising textual information corresponding to corresponding textual information in the video stream. The player selectively rendering the textual information on the video stream when the corresponding textual information occurs in the video stream.

7 Claims, 22 Drawing Sheets

1000

MASTER PLAYLIST

EXTM3U
EXT-X-STREAM-INF:BANDWIDTH=150000,RESOLUTION=416x234,CODECS="avc1.42e00a,mp4a.40.2"
http://example.com/low/index.m3u8
EXT-X-STREAM-INF:BANDWIDTH=240000,RESOLUTION=416x234,CODECS="avc1.42e00a,mp4a.40.2"
http://example.com/lo_mid/index.m3u8
EXT-X-STREAM-INF:BANDWIDTH=440000,RESOLUTION=416x234,CODECS="avc1.42e00a,mp4a.40.2"
http://example.com/hi_mid/index.m3u8
EXT-X-STREAM-INF:BANDWIDTH=640000,RESOLUTION=640x360,CODECS="avc1.42e00a,mp4a.40.2"
http://example.com/high/index.m3u8
EXT-X-STREAM-INF:BANDWIDTH=64000,CODECS="mp4a.40.5"
http://example.com/audio/index.m3u8

FIG. 3

VOD PLAYLIST

```
#EXTM3U
#EXT-X-PLAYLIST-TYPE:VOD
#EXT-X-TARGETDURATION:10
#EXT-X-VERSION:4
#EXT-X-MEDIA-SEQUENCE:0
#EXTINF:10.0,
http://example.com/movie1/fileSequenceA.ts
#EXTINF:10.0,
http://example.com/movie1/fileSequenceB.ts
#EXTINF10.0,
http://example.com/movie1/fileSequenceC.ts
#EXTINF:9.0,
http://example.com/movie1/fileSequenceD.ts
#EXT-X-ENDLIST
```

FIG. 4

EVENT PLAYLIST

```
#EXTM3U
#EXT-X-PLAYLIST-TYPE:EVENT
#EXT-X-TARGETDURATION:10
#EXT-X-VERSION:4
#EXT-X-MEDIA-SEQUENCE:0
#EXTINF:10.00,
file Sequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts
```

FIG. 5

EVENT PLAYLIST UPDATED

```
#EXTM3U
#EXT-X-PLAYLIST-TYPE:EVENT
#EXT-X-TARGETDURATION:10
#EXT-X-VERSION:4
#EXT-X-MEDIA-SEQUENCE:0
#EXTINF:10.0,
fileSequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts // List of files between 4 and 120 go here.

EXTINF:10.0,
fileSequence120.ts
#EXTINF:10.0,
fileSequence121.ts
#EXT-X-ENDLIST
```

FIG. 6

SLIDING WINDOW PLAYLIST

```
#EXTM3U
#EXT-X-TARGETDURATION:10
#EXT-X-VERSION:4
#EXT-X-MEDIA-SEQUENCE:1
#EXTINF:10.0,
fileSequence1.ts
#EXTINF:10.0,
fileSequence2.ts
#EXTINF:10.0,
fileSequence3.ts
#EXTINF:10.0,
fileSequence4.ts
#EXTINF:10.0,
fileSequence5.ts
```

FIG. 7

SLIDING WINDOW PLAYLIST UPDATED

```
#EXTM3U
#EXT-X-TARGETDURATION:10
#EXT-X-VERSION:4
#EXT-X-MEDIA-SEQUENCE:2
#EXTINF:10.0,
fileSequence2.ts
#EXTINF:10.0,
fileSequence3.ts
#EXTINF:10.00,
fileSequence4.ts
#EXTINF:10.00,
fileSequence5.ts
#EXTINF:10.0,
fileSequence6.ts
```

FIG. 8

SLIDING WINDOW PLAYLIST UPDATED

```
#EXTM3U
#EXT-X-TARGETDURATION:10
#EXT-X-VERSION:4
#EXT-X-MEDIA-SEQUENCE:4
#EXTINF:10.00,
fileSequence4.ts
#EXTINF:10.00,
fileSequence5.ts
#EXTINF:10.0,
fileSequence6.ts
#EXTINF:10.0,
fileSequence7.ts
#EXTINF:10.0,
fileSequence8.ts
#EXTINF:10.0,
fileSequence9.ts
```

FIG. 9

| PROFILE # | STREAM | CONTAINER | CODEC | TYPE | RESOLUTION | FPS | BIT RATE |
|---|---|---|---|---|---|---|---|
| | SPTS | MPEG2-TS | AVC | High 4.1 | 1920x1080 | 29.97 | 6.750 |
| | SPTS | MPEG2-TS | AVC | High 4.1 | 1920x1080 | 29.97 | 4.500 |
| | SPTS | MPEG2-TS | AVC | High 4.1 | 1920x1080 | 29.97 | 3.000 |
| | SPTS | MPEG2-TS | AVC | High 4.1 | 1280x720 | 29.97 | 4.125 |
| | SPTS | MPEG2-TS | AVC | High 4.1 | 1280x720 | 29.97 | 2.750 |
| | SPTS | MPEG2-TS | AVC | Main 3.0 | 1280x720 | 29.97 | 2.500 |
| | SPTS | MPEG2-TS | AVC | Main 3.0 | 1280x720 | 29.97 | 2.100 |
| | SPTS | MPEG2-TS | AVC | Main 3.0 | 854x480 | 29.97 | 1.500 |
| | SPTS | MPEG2-TS | AVC | Main 3.0 | 854x480 | 29.97 | 1.000 |
| | SPTS | MPEG2-TS | AVC | Main 3.0 | 640x360 | 29.97 | 0.600 |
| | SPTS | MPEG2-TS | AVC | Main 3.0 | 416x240 | 29.97 | 0.250 |
| | SPTS | MPEG2-TS | AVC | Main 3.0 | 640x480 | 29.97 | 1.250 |
| | SPTS | MPEG2-TS | AVC | Main 3.0 | 640x480 | 29.97 | 0.900 |
| | SPTS | MPEG2-TS | AVC | Main 3.0 | 480x360 | 29.97 | 0.500 |
| | SPTS | MPEG2-TS | AVC | Main 3.0 | 320x240 | 29.97 | 0.250 |
| | SPTS | MPEG2-TS | AVC | Base 3.0 | 848x480 | 29.97 | 0.700 |
| | SPTS | MPEG2-TS | AVC | Base 3.0 | 640x480 | 29.97 | 1.200 |
| | SPTS | MPEG2-TS | AVC | Base 3.0 | 640x480 | 29.97 | 0.900 |
| | SPTS | MPEG2-TS | AVC | Base 3.0 | 480x320 | 29.97 | 0.900 |
| | SPTS | MPEG2-TS | AVC | Base 3.0 | 480x320 | 29.97 | 0.600 |

FIG. 11

1400 — RECEIVE AUDIO VIDEO CONTENT IN AN INITIAL FORMAT

1410 — TRANSCODER

1420 — TRANSCODED AUDIO VIDEO CONTENT IN A DIFFERENT FORMAT

1430 — ENCODING ERRORS

1500 — RECEIVE AUDIO VISUAL ENCODED CONTENT

1510 — VIDEO PROCESSOR

1520 — IDENTIFY POTENTIAL ERRORS

IDENTIFY METADATA FILES ASSOCIATED WITH AUDIO VIDEO CONTENT

MODIFY METADATA FILES TO IDENTIFY ERRORS(S)

| PROFILE # | STREAM | CONTAINER | CODEC | TYPE | RESOLUTION | FPS | BIT RATE |
|---|---|---|---|---|---|---|---|
| | SPTS | MPEG2-TS | AVC | High 4.1 | 1920x1080 | 29.97 | 6.750 |
| | SPTS | MPEG2-TS | AVC | High 4.1 | 1920x1080 | 29.97 | 4.500 |
| | SPTS | MPEG2-TS | AVC | High 4.1 | 1920x1080 | 29.97 | 3.000 |
| | SPTS | MPEG2-TS | AVC | High 4.1 | 1280x720 | 29.97 | 4.125 |
| | SPTS | MPEG2-TS | AVC | High 4.1 | 1280x720 | 29.97 | 2.750 |
| | SPTS | MPEG2-TS | AVC | Main 3.0 | 1280x720 | 29.97 | 2.500 |
| | SPTS | MPEG2-TS | AVC | Main 3.0 | 1280x720 | 29.97 | 2.100 |
| | SPTS | MPEG2-TS | AVC | Main 3.0 | 854x480 | 29.97 | 1.500 |
| | SPTS | MPEG2-TS | AVC | Main 3.0 | 854x480 | 29.97 | 1.000 |
| | SPTS | MPEG2-TS | AVC | Main 3.0 | 640x360 | 29.97 | 0.600 |
| | SPTS | MPEG2-TS | AVC | Main 3.0 | 416x240 | 29.97 | 0.250 |
| | SPTS | MPEG2-TS | AVC | Main 3.0 | 640x480 | 29.97 | 1.250 |
| | SPTS | MPEG2-TS | AVC | Main 3.0 | 640x480 | 29.97 | 0.900 |
| | SPTS | MPEG2-TS | AVC | Main 3.0 | 480x360 | 29.97 | 0.500 |
| | SPTS | MPEG2-TS | AVC | Main 3.0 | 320x240 | 29.97 | 0.250 |
| | SPTS | MPEG2-TS | AVC | Base 3.0 | 848x480 | 29.97 | 0.700 |
| | SPTS | MPEG2-TS | AVC | Base 3.0 | 640x480 | 29.97 | 1.200 |
| | SPTS | MPEG2-TS | AVC | Base 3.0 | 640x480 | 29.97 | 0.900 |
| | SPTS | MPEG2-TS | AVC | Base 3.0 | 480x320 | 29.97 | 0.900 |
| | SPTS | MPEG2-TS | AVC | Base 3.0 | 480x320 | 29.97 | 0.600 |

```
#EXTM3U
#EXT-X-PLAYLIST-TYPE:VOD
#EXT-X-TARGETDURATION:10
#EXT-X-VERSION:4
#EXT-X-MEDIA SEQUENCE:0
#EXTINF:10.0,
http://example.com/movie1/fileSequenceA.ts
#EXTINF:10.0,
#EXT-X-EXPECT-ERROR:2.4,9.1-audio//player to expect error
From 2.4 and from 9.1 second in fileSequenceB.ts and at 9.1 expect audio issue
http://example.com/movie1/fileSequenceB.ts
#EXTINF10.0,
http://example.com/movie1/fileSequenceC.ts
#EXTINF:9.0,
#EXT-X-EXPECT-ERROR:2.5-2.9//player to expects error
from 2.5 to 2.9 in fileSequenceD.ts
http://example.com/movie1/fileSequenceD.ts
#EXT-X-ENDLIST
```

FIG. 18

1900 — PLAYER RECEIVES AUDIO VIDEO CONTENT AND PLAYLIST WITH ERROR TAG

1910 — PARSE PLAYLIST TO IDENTIFY ERROR TAG

1920 — PARSE IDENTIFIED ERROR TAG(S)

1930 — SELECTIVELY DETERMINE WHETHER CORRECTIVE ACTION SHOULD BE TAKEN

2100 — PLAYER

2110 — RECEIVE PLAYLISTS AND AUDIO/VIDEO CHUNK FILES RENDERED AT NORMAL FRAME RATE

2120 — PAUSE RECEIVING PLAYLISTS AND AUDIO/VIDEO CHUNK FILES

2130 — SELECT FAST FORWARD RATE

2140 — SELECTING CORRESPONDING PLAYLISTS AND AUDIO/VIDEO CHUNK FILES AT SELECTED FAST FORWARD RATE

2150 — SWITCH TO PLAYLISTS AND AUDIO/VIDEO CHUNK FILES AT NORMAL FRAME RATE

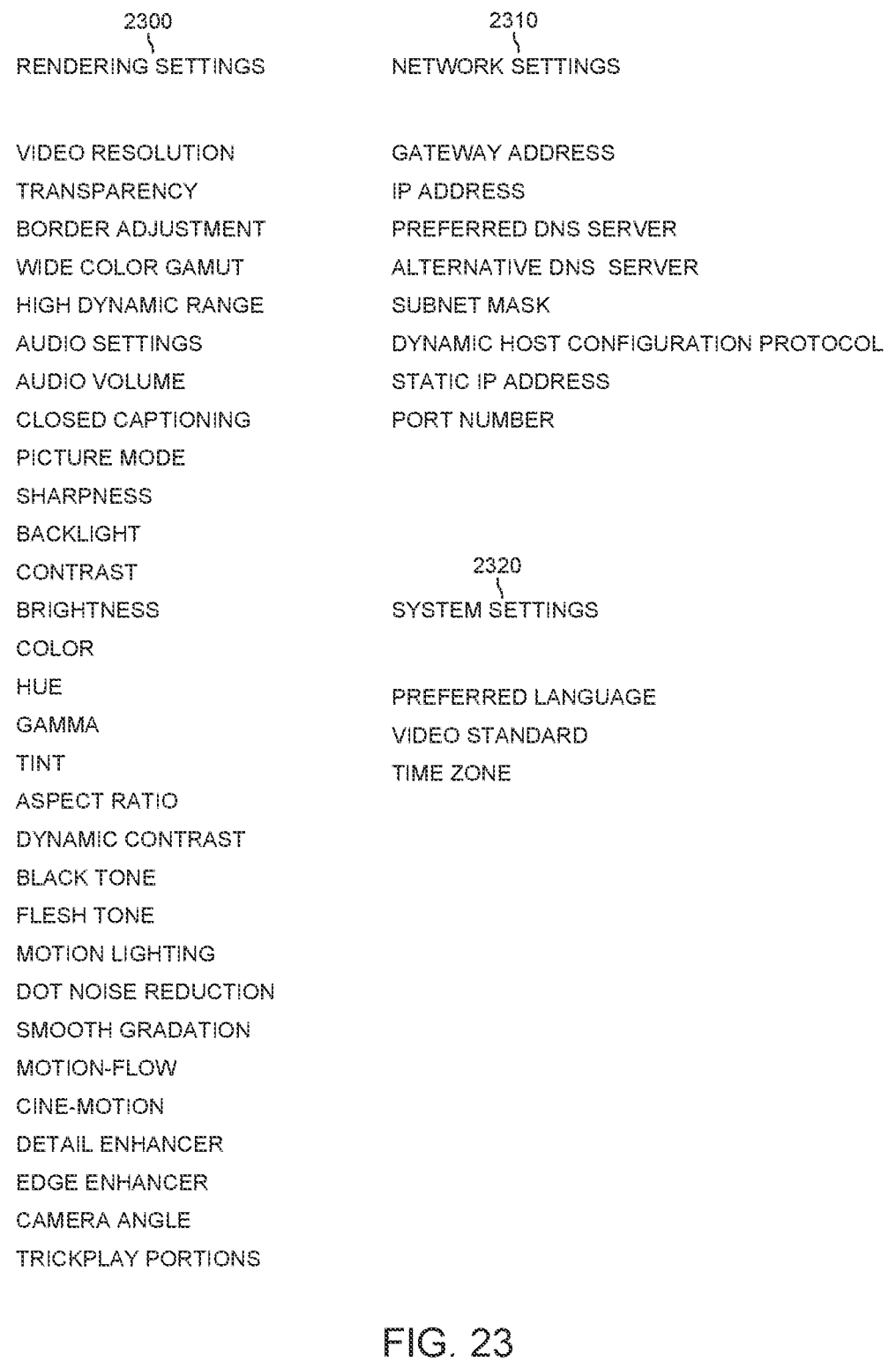

2300
RENDERING SETTINGS

2310
NETWORK SETTINGS

VIDEO RESOLUTION
TRANSPARENCY
BORDER ADJUSTMENT
WIDE COLOR GAMUT
HIGH DYNAMIC RANGE
AUDIO SETTINGS
AUDIO VOLUME
CLOSED CAPTIONING
PICTURE MODE
SHARPNESS
BACKLIGHT
CONTRAST
BRIGHTNESS
COLOR
HUE
GAMMA
TINT
ASPECT RATIO
DYNAMIC CONTRAST
BLACK TONE
FLESH TONE
MOTION LIGHTING
DOT NOISE REDUCTION
SMOOTH GRADATION
MOTION-FLOW
CINE-MOTION
DETAIL ENHANCER
EDGE ENHANCER
CAMERA ANGLE
TRICKPLAY PORTIONS

GATEWAY ADDRESS
IP ADDRESS
PREFERRED DNS SERVER
ALTERNATIVE DNS  SERVER
SUBNET MASK
DYNAMIC HOST CONFIGURATION PROTOCOL
STATIC IP ADDRESS
PORT NUMBER

2320
SYSTEM SETTINGS

PREFERRED LANGUAGE
VIDEO STANDARD
TIME ZONE

FIG. 23

VIDEO SYSTEM

CROSS REFERENCE TO RELATED APPLICATIONS

This application claims the benefit of U.S. Provisional Patent Application Ser. No. 63/168,488 filed Mar. 31, 2021; claims the benefit of U.S. Provisional Patent Application Ser. No. 63/168,496 filed Mar. 31, 2021; claims the benefit of U.S. Provisional Patent Application Ser. No. 63/168,502 filed Mar. 31, 2021; claims the benefit of U.S. Provisional Patent Application Ser. No. 63/169,626 filed Apr. 1, 2021.

BACKGROUND

The subject matter of this application relates to a video system.

Cable system operators and other network operators provide streaming media to a gateway device for distribution in a consumer's home. The gateway device offers a singular point to access different types of content, such as live content, on-demand content, online content, over-the-top content, and content stored on a local or a network based digital video recorder. The gateway enables a connection to home network devices. The connection may include, for example, connection to a WiFi router or a Multimedia over Coax Alliance (MoCA) connection that provide IP over in-home coaxial cabling.

Consumers prefer to use devices that are compliant with standard protocols to access streaming video from the gateway device, so that all the devices within the home are capable of receiving streaming video content provided from the same gateway device. HTTP Live Streaming (HLS) is an adaptive streaming communications protocol created by Apple to communicate with iOS, Apple TV devices, and Macs running OSX Snow Leopard or later. HLS is capable of distributing both live and on-demand files, and is the sole technology available for adaptively streaming to Apple devices.

BRIEF DESCRIPTION OF THE DRAWINGS

For a better understanding of the invention, and to show how the same may be carried into effect, reference will now be made, by way of example, to the accompanying drawings, in which:

FIG. 3 illustrates a HLS mater playlist.

FIG. 4 illustrates a HLS VOD playlist.

FIG. 5 illustrates an event playlist.

FIG. 6 illustrates an updated event playlist.

FIG. 7 illustrates a sliding window playlist.

FIG. 8 illustrates an updated sliding window playlist.

FIG. 9 illustrates a further updated sliding window playlist.

FIG. 11 illustrates various content profiles.

FIG. 17 illustrates various content profiles.

FIG. 18 illustrates an exemplary playlist with an error tag.

FIG. 23 illustrates rendering settings, network settings, and system settings.

DETAILED DESCRIPTION

Figure 1:
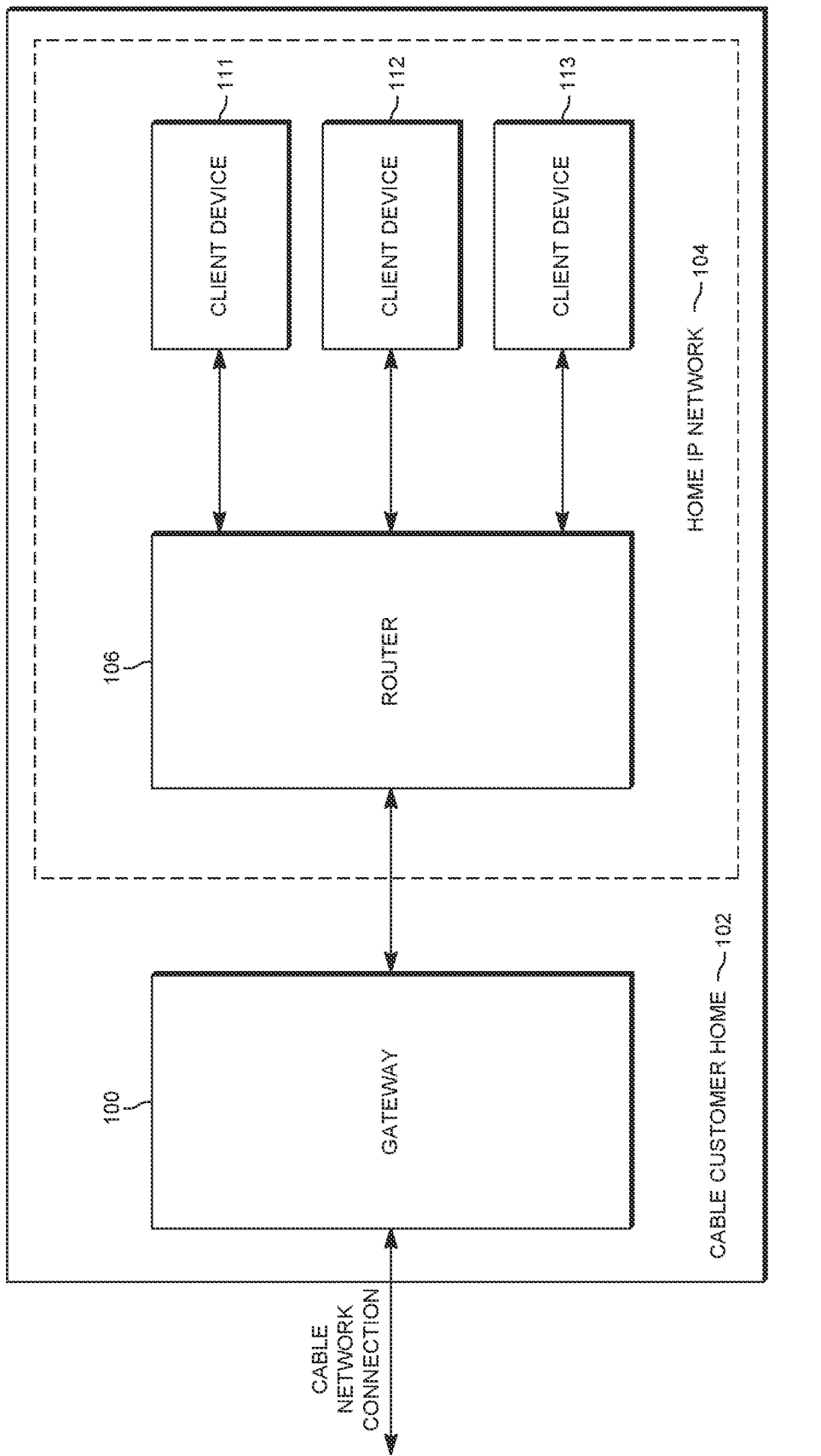
FIG. 1 illustrates an overview of a cable system.

Referring to FIG. 1, a cable system overview is illustrated with a cable network connection provided to a gateway 100 of a cable customer's home 102. The cable network connection provided to the gateway 100 may be from a cable system operator or other streaming content provider, such as a satellite system. The gateway 100 provides content to devices in a home network 104 in the consumer's home 102. The home network 104 may include a router 106 that receives IP content from the gateway 100 and distributes the content over a WiFi or a cable connection to client devices 111, 112, 113. The router 106 may be included as part of the gateway 100. In general, the cable network connection, or other types of Internet or network connection, provides streaming media content to client devices in any suitable manner. The streaming media content may be in the form of HTTP Live Streaming (HLS), Dynamic Adaptive Streaming over HTTP (DASH), or otherwise.

Figure 2:
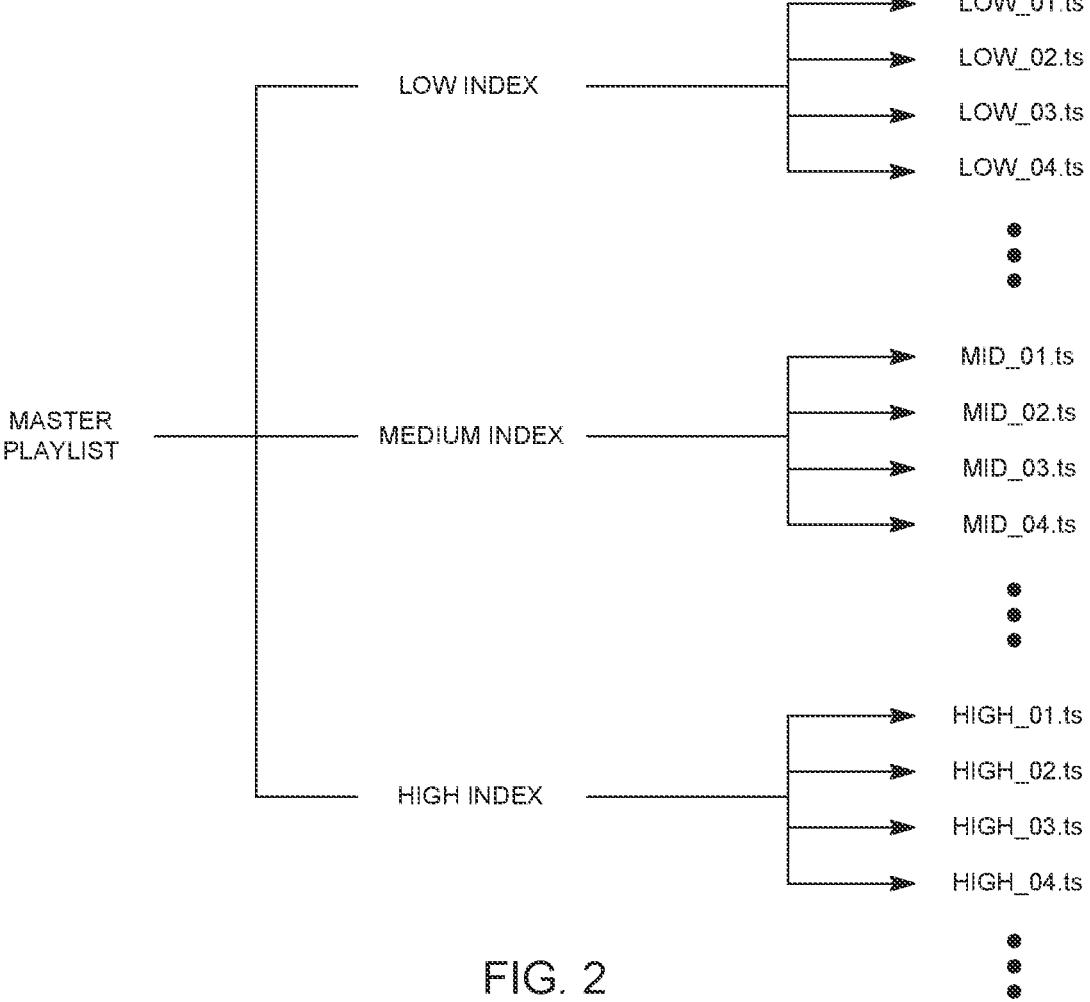
FIG. 2 illustrates HLS streaming video content.

Referring to FIG. 2, at a high level HLS enables adaptive streaming of video content, by creating multiple files for distribution to a media player, which adaptively changes media streams being obtained to optimize the playback experience. HLS is a HTTP-based technology so that no streaming server is required, so all the switching logic resides on the player. To distribute content to HLS players, the video content is encoded into multiple files at different data rates and divided into short chucks, each of which is typically between 5-10 seconds long. The chunks are loaded onto a HTTP server along with a text based manifest file with a .M3U8 extension that directs the player to additional manifest files for each of the encoded media streams. The short video content media files are generally referred to as "chunked" files.

The player monitors changing bandwidth conditions over time to the player. If the change in bandwidth conditions indicates that the stream should be changed to a different bit rate, the player checks the master manifest file for the location of additional streams having different bit rates. Using a stream specific manifest file for a selected different stream, the URL of the next chuck of video data is requested. In general, the switching between video streams by the player is seamless to the viewer.

A master playlist (e.g., manifest file) describes all of the available variants for the content. Each variant is a version of the stream at a particular bit rate and is contained in a separate variant playlist (e.g., manifest file). The client switches to the most appropriate variant based on the measured network bit rate to the player. The master playlist isn't typically re-read. Once the player has read the master playlist, it assumes the set of variants isn't changing. The stream ends as soon as the client sees the EXT-X-ENDLIST tag on one of the individual variant playlists.

For example, the master playlist may include a set of three variant playlists. A low index playlist, having a relatively low bit rate, may reference a set of respective chunk files. A medium index playlist, having a medium bit rate, may reference a set of respective chunk files. A high index playlist, having a relatively high bit rate, may reference a set of respective chunk files.

Referring to FIG. 3, an exemplary master playlist that defines five different variants is illustrated. Exemplary tags used in the master playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-STREAM-INF: Indicates that the next URL in the playlist file identifies another playlist file. The EXT-X-STREAM-INF tag has the following parameters.

AVERAGE-BANDWIDTH: An integer that represents the average bit rate for the variant stream.

BANDWIDTH: An integer that is the upper bound of the overall bitrate for each media file, in bits per second. The upper bound value is calculated to include any container overhead that appears or will appear in the playlist.

FRAME-RATE: A floating-point value that describes the maximum frame rate in a variant stream.

HDCP-LEVEL: Indicates the type of encryption used. Valid values are TYPE-0 and NONE. Use TYPE-0 if the stream may not play unless the output is protected by HDCP.

RESOLUTION: The optional display size, in pixels, at which to display all of the video in the playlist. This parameter should be included for any stream that includes video.

VIDEO-RANGE: A string with valid values of SDR or PQ. If transfer characteristic codes 1, 16, or 18 aren't specified, then this parameter must be omitted.

CODECS: (Optional, but recommended) A quoted string containing a comma-separated list of formats, where each format specifies a media sample type that's present in a media segment in the playlist file. Valid format identifiers are those in the ISO file format name space defined by RFC 6381 [RFC6381].

Referring to FIG. 4, one of the types of video playlists include a video on demand (VOD) playlist. For VOD sessions, media files are available representing the entire duration of the presentation. The index file is static and contains a complete list of URLs to all media files created since the beginning of the presentation. This kind of session allows the client full access to the entire program.

Exemplary tags used in the VOD playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

EXT-X-ENDLIST: Indicates that no more media files will be added to the playlist file.

The VOD playlist example in FIG. 4 uses full pathnames for the media file playlist entries. While this is allowed, using relative pathnames is preferable. Relative pathnames are more portable than absolute pathnames and are relative to the URL of the playlist file. Using full pathnames for the individual playlist entries often results in more text than using relative pathnames.

Referring to FIG. 5, an event playlist is specified by the EXT-X-PLAYLIST-TYPE tag with a value of EVENT. It doesn't initially have an EXT-X-ENDLIST tag, indicating that new media files will be added to the playlist as they become available.

Exemplary tags used in the EVENT playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

Items are not removed from the playlist when using the EVENT tag; rather new segments are appended to the end of the file. New segments are added to the end of the file until the event has concluded, at which time the EXT-X-END-LIST tag may be appended. Referring to FIG. 6, the same playlist is shown after it's been updated with new media URIs and the event has ended. Event playlists are typically used when you want to allow the user to seek to any point in the event, such as for a concert or sports event.

Referring to FIG. 7, a live playlist (sliding window) is an index file that is updated by removing media URIs from the file as new media files are created and made available. The EXT-X-ENDLIST tag isn't present in the live playlist, indicating that new media files will be added to the index file as they become available.

Exemplary tags used in the live playlist may include one or more of the following.

EXTM3U: Indicates that the playlist is an extended M3U file. This type of file is distinguished from a basic M3U file by changing the tag on the first line to EXTM3U. All HLS playlists must start with this tag.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration. In addition, the live playlist can use an EXT-X-ENDLIST tag to signal the end of the content. Also, the live playlist preferably does not include the EXT-X-PLAYLIST-TYPE type.

Referring to FIG. 8, the same playlist of FIG. 7 is shown after it has been updated with new media URIs.

Referring to FIG. 9, the playlist FIG. 8 continues to be updated as new media URIs are added.

Another adaptive streaming technology is referred to as Dynamic Adaptive Streaming over HTTP (DASH), also generally referred to as MEGP-DASH, that enables streaming of media content over the Internet delivered from conventional HTTP web servers. MPEG-DASH employs content broken into a sequence of small HTTP-based file segments, where each segment contains a short interval of playback time of content. The content is made available at a variety of different bit rates. While the content is being played back at an MPEG-DASH enabled player, the player uses a bit rate adaptation technique to automatically select the segment with the highest bit rate that can be downloaded in time for playback without causing stalls or re-buffering events in the playback. In this manner, a MPEG-DASH enabled video player can adapt to changing network conditions and provide high quality playback with fewer stalls or re-buffering events. DASH is described in ISO/IEC 23009-1:2014 "Information technology—Dynamic adaptive streaming over HTTP (DASH)—Part 1: Media presentation description and segment formats", incorporated by reference herein in its entirety.

In many video streaming technologies, including MPEG-2, the video frames are encoded as a series of frames to achieve data compression and typically provided using a transport stream. Each of the frames of the video are typically compressed using either a prediction based technique and a non-prediction based technique. An I frame is a frame that has been compressed in a manner that does not require other video frames to decode it. A P frame is a frame that has been compressed in a manner that uses data from a previous frame(s) to decode it. In general, a P frame is more highly compressed than an I frame. A B frame is a frame that has been compressed in a manner that uses data from both previous and forward frames to decode it. In general, a B frame is more highly compressed than a P frame. The video stream is therefore composed of a series of I, P, and B frames. MPEG-2 is described in ISO/IEC 13818-2:2013 "Information technology—Generic coding of moving pictures and associated audio information—Part 2: Video" incorporated by reference herein in its entirety. In some encoding technologies, including H.264, an IDR (instantaneous decoder refresh) frame is made up an intra code picture that also clears the reference picture buffer. However, for purposes of discussion the I frame and the IDR frame will be referred to interchangeably. In some encoding technologies, the granularity of the prediction types may be brought down to a slice level, which is a spatially distinct region of a frame that is encoded separately from any other regions in the same frame. The slices may be encoded as I-slices, P-slices, and B-slices in a manner akin to I frames, P-frames, and B-frames. However, for purposes of discussion I frame, P frame, and B frame are also intended to include I-slice, P-slice, and B-slice, respectively. In addition, the video may be encoded as a frame or a field, where the frame is a complete image and a field is a set of odd numbered or even numbered scan lines composing a partial image. However, for purposes of discussion both "frames" and "pictures" and "fields" are referred to herein as "frames". H.264 is described in ITU-T (2019) "SERIES H: AUDIOVISUAL AND MULTIMEDIA SYSTEMS Infrastructure of audiovisual services—Coding of moving video", incorporated by reference herein in its entirety.

As previously described, the server or otherwise a file storage location, maintains different playlists each of which normally having different bit rates (e.g., quality) indicating different files. The player downloads the playlist files, and then based upon available network bandwidth, or other criteria, selects files from an appropriate playlist. The player plays the files, each of which may be referred to as a chunk, if in sequential manner. The player monitors the available bandwidth, or other criteria, and selects additional files based upon the monitored criteria.

Figure 10:
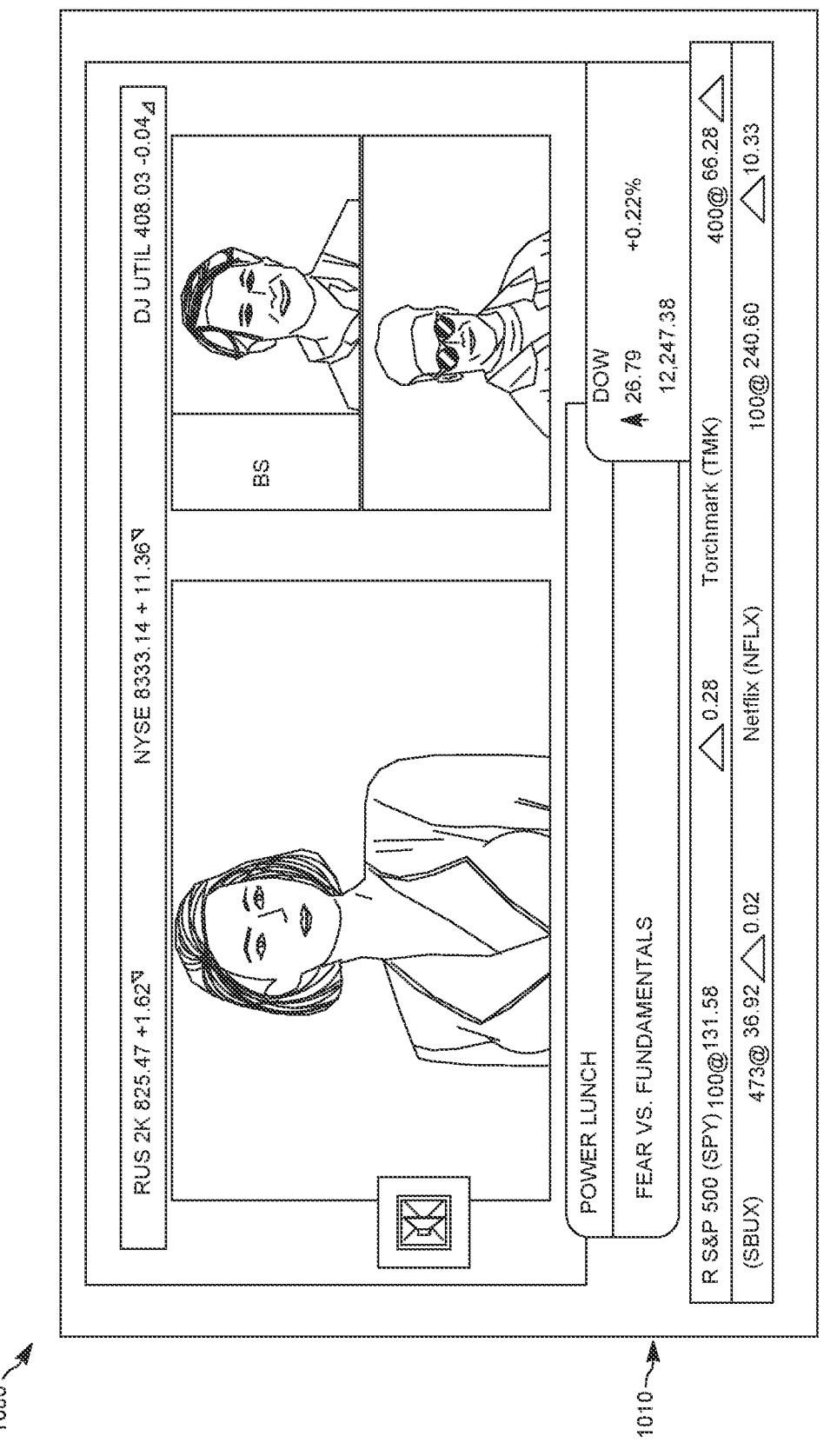
FIG. 10 illustrates a video frame with pictorial content and textual content.

Referring to FIG. 10, often a player receives video content that includes portions that are primarily pictorial content 1000 and portions that are primarily textual content 1010, such as a stock ticker. With a relatively high bandwidth network connection, the player may select relatively high quality video content where the pictorial content has a high quality and the textual content is crisp and clear to read. When the network to the player has a relatively low bandwidth, the player selects video content that has a lower image quality, where the pictorial content is typically of sufficient quality for viewing but the textual content is blurry and difficult to read. The blurriness of the textual content tends to be even more exaggerated in the case of scrolling text images, such as a stock ticker. In many cases, the relatively low bandwidth is persistent for an extended period of time, resulting in the textual content remaining blurry and difficult to read. Referring to FIG. 11, an exemplary set of content profiles are illustrated with the bit rates used for each.

Figure 12:
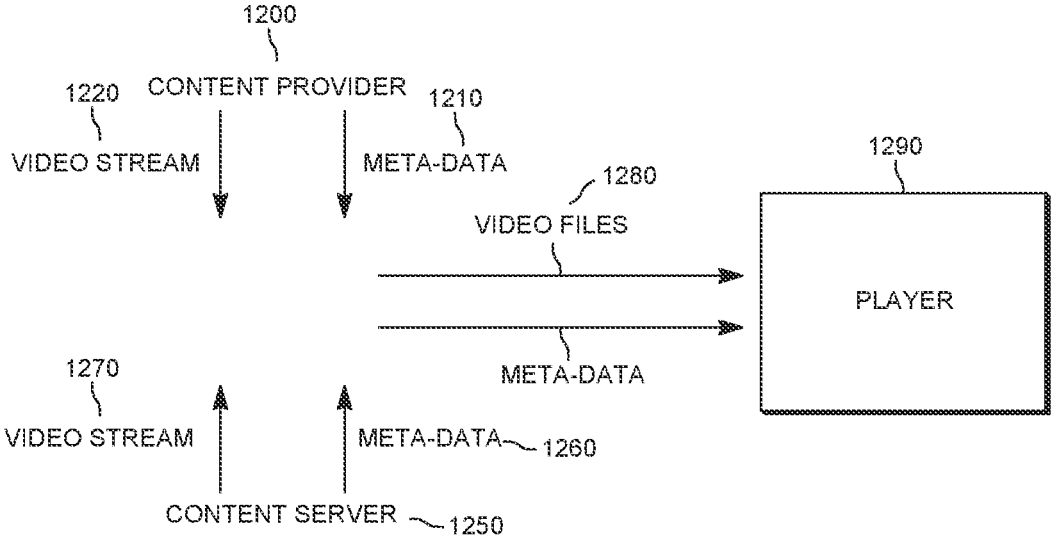
FIG. 12 illustrates a player receiving video files and meta-data containing textual information.

Referring to FIG. 12, to improve the readability of the textual materials, a content provider 1200 may include associated meta-data 1210 that provides the textual content included within the video stream 1220. The meta-data 1210 should be temporally synchronized with the video stream 1220 so the meta-data 1210 for a particular frame of the video or series of frames of the video stream can be determined. The meta-data 1210 should likewise indicate where (e.g., location, position) on the particular frame of the video or the series of frames of the video stream the textual content should be rendered and in what manner it should be rendered (e.g., size, font, style). The meta-data 1210 may be embedded within the video stream 1220 or separate from the video stream 1220, as desired. The meta-data 1210 may also be provided using a separate URI from the video stream, as desired.

In a similar manner, a content server 1250 may process the frames of the video stream to determine associated meta-data 1260 that provides the textual content included within the video stream 1270. The meta-data 1260 should be temporally synchronized with the video stream 1270 so the meta-data 1260 for a particular frame of the video or series of frames of the video stream can be determined. The meta-data 1260 should likewise indicate where (e.g., location, position) on the particular frame of the video or the series of frames of the video stream the textual content should be rendered and in what manner it should be rendered (e.g., size, font, style). The meta-data 1260 may be embedded within the video stream 1270 or separate from the video stream 1270, as desired. The meta-data 1260 may also be provided using a separate URI from the video stream, as desired.

If desired, the same meta-data 1210, 1260 may be associated with a plurality of different chunk files representing different bit rates of the video stream. Further, if desired the same meta-data 1210, 1260 files may be associated with a plurality of different chuck files, which reduces the storage requirements and complexity associated with maintaining a plurality of different meta-data 1210, 1260 files.

In either case, the chunk files and associated meta-data (in the form of one or more files) are provided to the player across the network connection. In either case, the video stream comprised of a series of video files 1280 are received by a player 1290. Also, in either case, the meta-data comprised of one or more files 1282 is received by the player 1290. The player 1290 processes the meta-data and renders the video content with the textual content overlaid on the video content, preferably in an appropriate location. In this manner, the textual content may be viewed by the user in a manner that is clear and easy to read.

Figure 13:
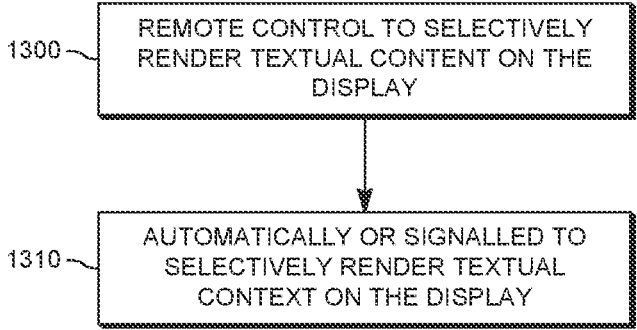
FIG. 13 illustrates selectively rendering the textual information from the meta-data.

Referring to FIG. 13, the player 1290 may determine when to render the text along with the video content on the display. The player 1290 may also determine any suitable manner of rendering the text along with the video content on a display. For example, the user may use a remote or other control 1300, to signal the player 1290 to selectively render the textual material on the display. For example, the player 1290 may automatically determine or otherwise be signalled 1310 that the video content is of sufficiently low quality to selectively render the textual material on the display.

Figure 14:
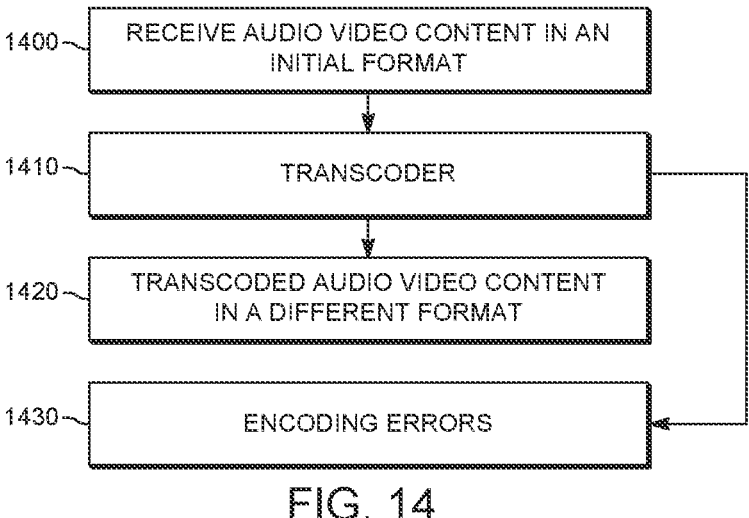
FIG. 14 illustrates a transcoder and encoding errors.

Referring to FIG. 14, in many cases, the audio video content is received in an encoded initial format (either lossless or lossy) 1400, such as for example Motion JPEG 2000 or a high definition video format, that is then converted by a transcoder 1410 running on a computer server (that includes a processor) to an encoded different format (either lossless or lossy) 1420, such as for example MPEG-2, MPEG-4, HEVC, HLS, DASH, or AVC. The selection of the different format normally depends on the characteristics of the player by which the audio-video content is going to be rendered. The transcoded audio video content 1420 is typically stored on a server to be provided to a player or otherwise stored on a network device where the file(s) are made available to a player. Encoding errors 1430 often occur during the transcoding process that includes the identification of the nature of the errors and the location in the audio video content where the errors occur. The errors are available either from the transcoder, encoded as meta-data within the audio video transcoded file, or otherwise stored in a file.

Figure 15:
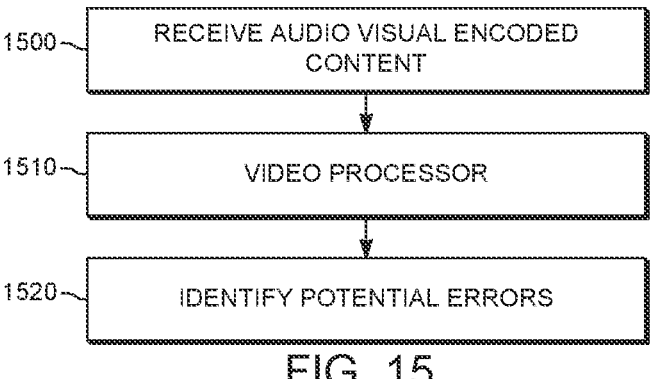
FIG. 15 illustrates a video processor and encoding errors.

Referring to FIG. 15, in other embodiments, the audio video content is received in a desired encoded format 1500 (either lossless or lossy), such as for example, MPEG-2, MPEG-4, HEVC, HLS, DASH, or AVC. The received audio video content is typically stored on a server to be provided to a player or otherwise stored on a network device where the file(s) are made available to a player. A video processor 1510 may be used to examine the audio video content to identify potential errors 1520 that may have occurred during the encoding process, together with the identification of the nature of the errors and the location in the audio video content where the errors occur. The errors are available either from the video processor, encoded as meta-data within the audio video file, or otherwise stored in a file.

By way of example, the errors may be the result of a software error, a feed of audio video content that was temporally interrupted, an overloaded processor of the audio video content, or otherwise. By way of example, the errors may manifest themselves as garbled audio content, black frames of video content, cracking audio sounds, frozen video content, or otherwise.

Typically, it would be desirable for the server to re-encode the audio video content or otherwise process the video content to remove the errors that have occurred so that error free content is provided to the player. Unfortunately, during a live streaming event, such as a live sporting event or a live concert, there is normally insufficient time available to re-encode the audio video content in a manner to remove the errors without interrupting the audio video stream to the player. In contrast to a typical process of attempting to provide error free audio video content to the player, it is desirable to identify the temporal location of the errors in the audio video content together with the nature of the error, and make this information available to the player. The player in turn, uses this information to determine an appropriate responsive activity to reduce the impact of the error on the user's experience of consuming the audio video content. For example, the player may take an action related to the error to skip the portion with the error, mute the portion with the error, replace the video portion with an "error screen", supplement the video portion with a banner indicating an error occurring, or otherwise.

Figure 16:
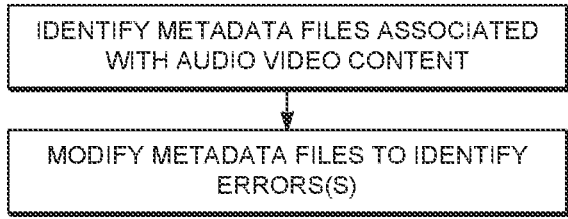
FIG. 16 illustrates modification of meta-data file(s).

Referring to FIG. 16, in the case of chunk based audio video content (e.g., HLS, DASH) the manifest file(s) and/or playlist file(s) (i.e., meta-data file(s)) associated with an audio video file(s) that includes an error encoded therein is modified to identify the timing of the error within the audio video file together with the characteristic of the error within the audio video file. Referring to FIG. 17, an exemplary set of content profiles are illustrated with the bit rates used for each.

Referring to FIG. 18, for example, the HLS playlist may be marked with an error tag 1800 indicating the transcoding errors to inform the player of the error(s), and preferably the nature of the error(s).

Figure 19:
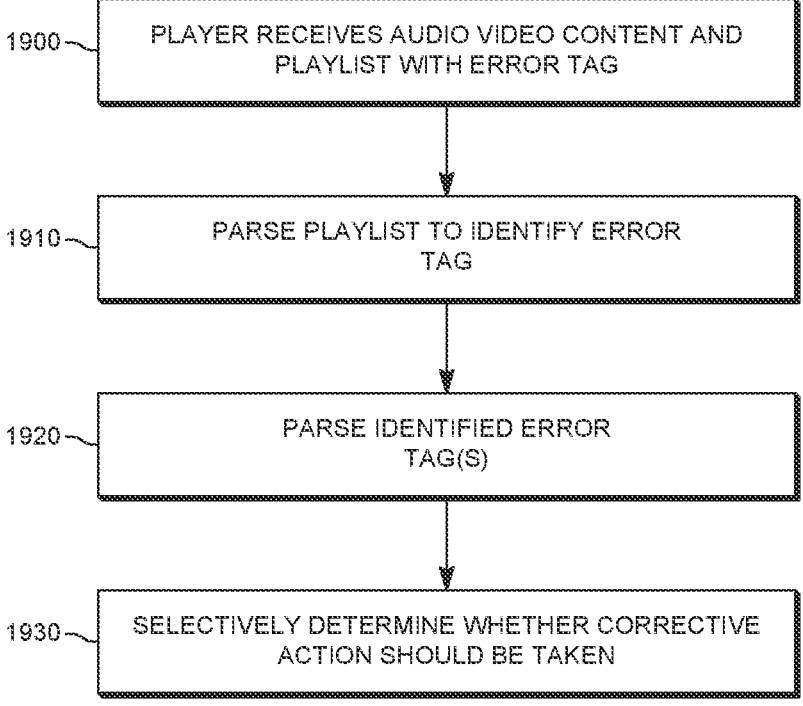
FIG. 19 illustrates a player selectively processing based upon the error tag of FIG. 18.

Referring to FIG. 19, the player receives the audio video content and the playlist that includes the error tag 1900. The player parses the playlist to identify whether it includes one or more error tags 1910. The player then parses any identified error tags 1920 to determine the timing for the error(s) and the characteristics of the error(s). The player then selectively determines whether corrective action should be taken 1930 to modify the rendering of the audio video content based upon the parsed error tag(s).

When the player is receiving a live stream, such as a sporting event or a concert, the sliding window playlist or other playlist type that permits the dynamic addition of additional audio video content as it becomes available, is used by the player to select the next suitable chunk of audio video content. Often the viewer wants to pause the playback of the live stream by selecting a pause function on the player, such as when the viewer needs to run an errand or attend to something else. After a period of delay, the viewer selects play again with the expectation that the live stream will resume at the position where it was paused. In some cases, the period of delay will be to long and the audio video content may no longer be available to the player from the network. In cases where the audio video content remains available, the viewer may use a trickplay mode, such as fast forward, to speed up the playback of the paused audio video content as is it received by the player. In many cases, the player may render the I frames in a manner that provides for fast forward viewing of the paused audio video content. The player may render the audio video content at an accelerated speed until at such a time that the playback coincides with the current live stream, at which a time the player may automatically switch to normal speed playing to continue viewing additional audio video content as it becomes available. In this manner, the viewer may pause the audio video content while catching up to the live audio video content in a manner while being able to view the paused content. Unfortunately, the player downloading the audio video content for a fast forward trickplay tends to result in a substantial amount of bandwidth being consumed for audio video files having relatively large files, which may not otherwise be readily available from the network storage device or otherwise may not be readily available to the player.

Figure 20:
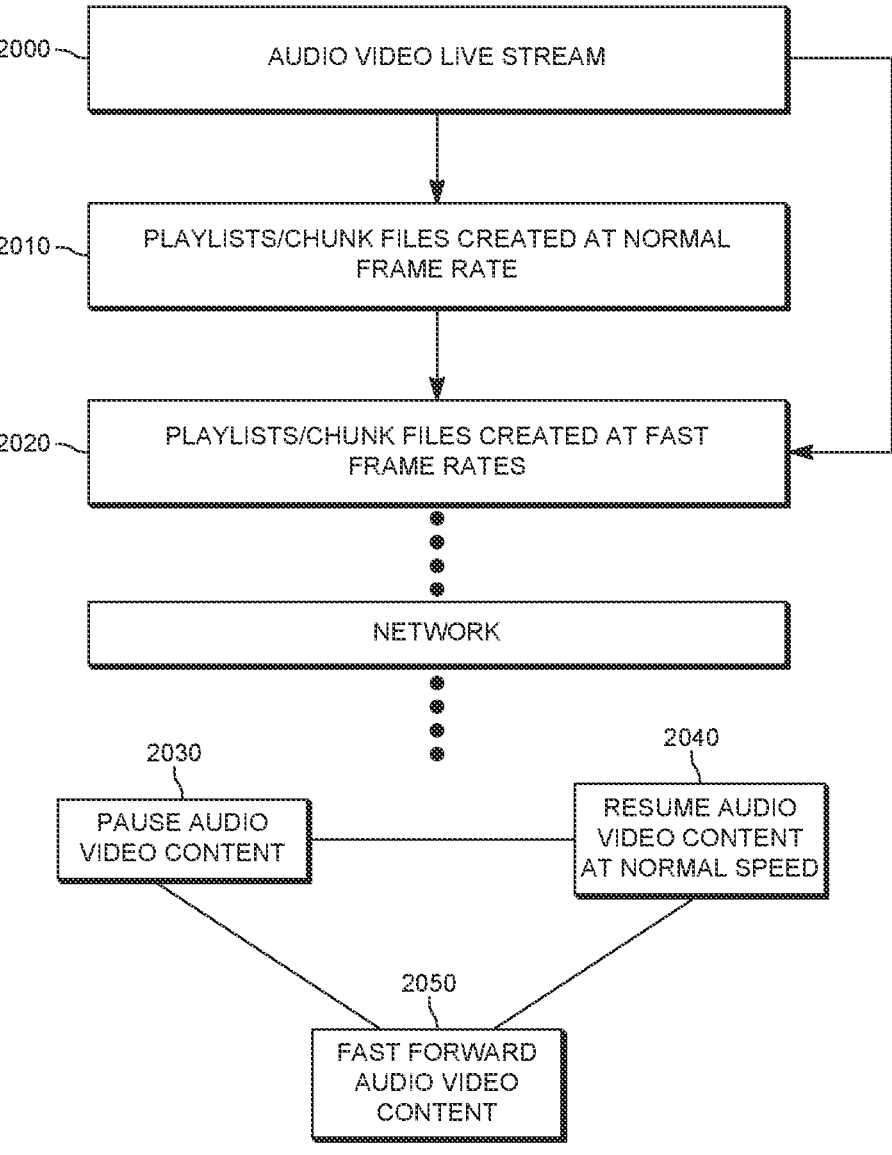
FIG. 20 illustrates creation of fast forward playlists and selection thereof.

Referring to FIG. 20, to reduce the bandwidth requirements it is desirable that the server creates one or more fast forward playlists and associated fast forward audio video chunk files for the live streaming audio video content. For example, the server may create playlists and associated chunk files at different resolutions 2010 (e.g., from relatively high bandwidth to relatively low bandwidth) from the received audio video live stream 2000 that play at a normal frame rate. The normal frame rate is typically the same as the frame rate of the audio video live stream 2000. For example, the server may create one or more fast forward playlists and associated fast forward chuck files at different resolutions 2020 (e.g., from relatively high bandwidth to relatively low bandwidth) from the received audio video live stream 2000 and/or the playlists and associated chunk files at different resolutions 2010. By way of example, the fast forward chunk files 2020 may be at 2× normal rate, at 4× normal rate, at 6× normal rate, at 8× normal rate, at 16× normal rate, or otherwise. Typically, the fast forward chunk files include a series of I frames, or otherwise fewer frames, than the corresponding frames in the live streaming audio video content for a temporal time period. Typically, each of the playlists references the typical audio video chunk files and the fast forward chunk files by unique universal resource identifiers. By way of example, the player may select a pause of the audio video content 2030 which pauses the receiving and the rendering of the audio visual content. By way of example, the player may select to resume of the audio video content which resumes playing the audio visual content at a normal speed 2040. By way of example, the player may select to fast forward the audio video content by selecting a playlist and associated chunk files associated with a fast forward speed 2050. Other speeds may be relative to another speed, such as multiple fast forward and/or fast reverse speeds.

Figure 21:
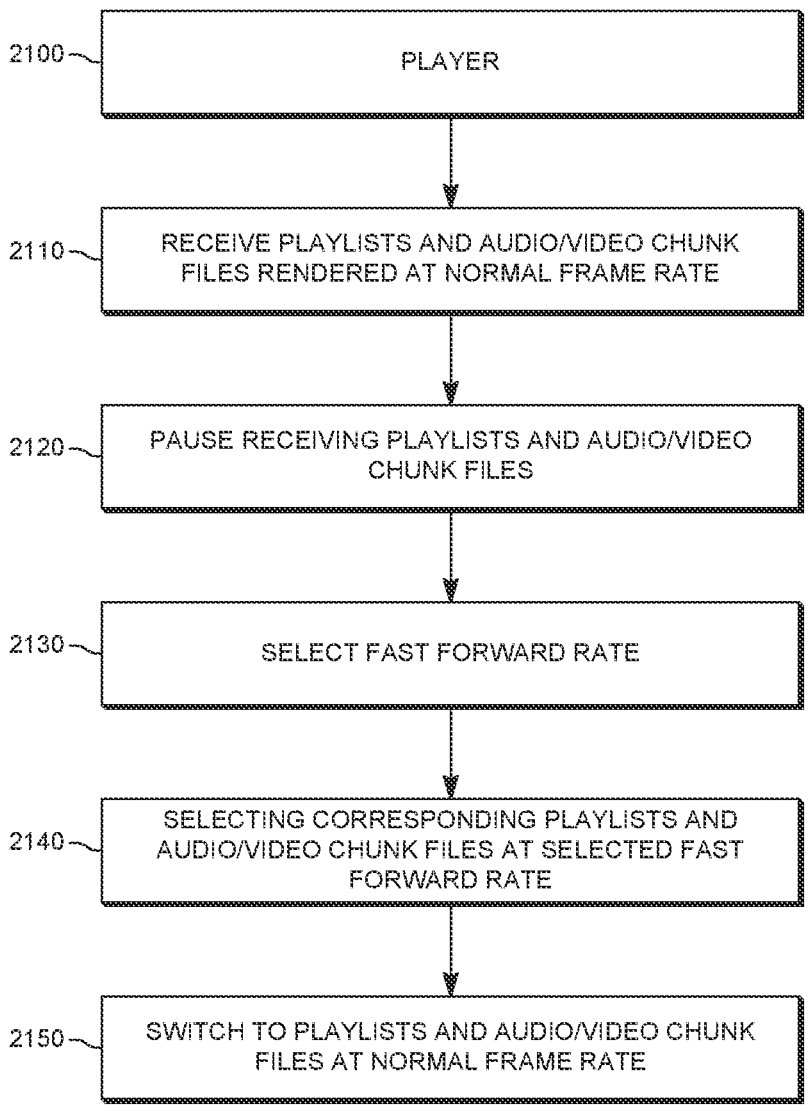
FIG. 21 illustrates an exemplary usage of fast forward playlists by a player.

Referring to FIG. 21, the player 2100 may for example be receiving audio video content (e.g., in the form of playlists and chunk files) that is rendered at a normal frame rate (e.g., at 60 frames per second) 2110. The player 2100 may for example pause receiving audio video content (e.g., in the form of playlists and chunk files) 2120. The player 2100 may for example, select a fast forward frame rate 2130 to be used when rendering the paused audio video content. By way of example, the fast forward chunk files may be at 2× normal rate, at 4× normal rate, at 6× normal rate, at 8× normal rate, at 16× normal rate, or otherwise. Preferably, the available fast forward frame rates 2130 is that may be selected from are consistent with the frame rates of the playlists and chunk files available on the network. The paused audio video content 2120 may be resumed at the selected fast forward rate 2130 by selecting the corresponding playlists and associated audio video chunk files 2140 that are rendered at that frame rate. Preferably, the corresponding playlists and associated audio video chunk files 2140 are created together with the creation of the other normal frame rate playlists and audio video chunk files. At a desired time or when the fast forward catches up with the live audio video stream, the player switches to the playlists and audio video chunk files associated with the live audio video stream 2150.

In an alternative embodiment, the fast forward playlists and associated audio video chunk files may be created on the fly, as needed.

Figure 22:
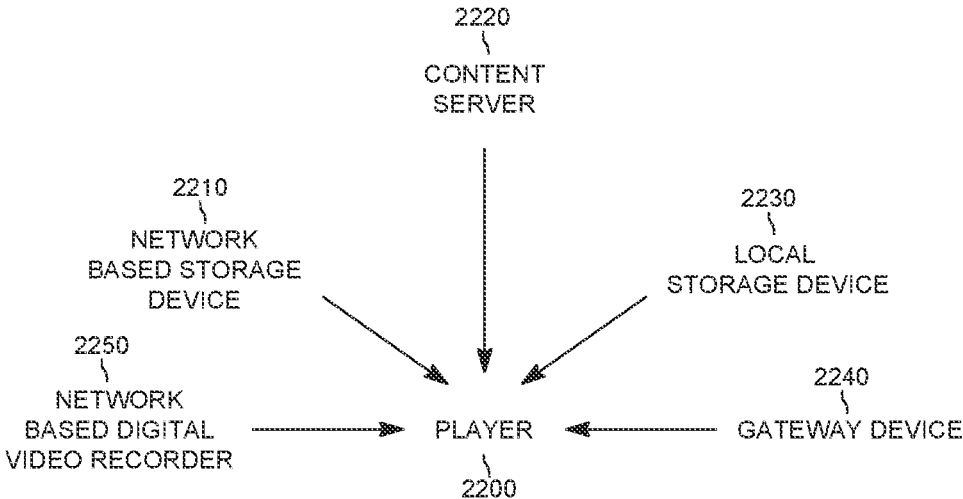
FIG. 22 illustrates a player and video content sources.

Referring to FIG. 22, often a player 2200 of video content receives its video content from a network based storage device 2210, receives its video content from a content server 2220, receives its video content from a local storage device 2230, receives its video content from a gateway device 2240, a network based digital video recorder 2250, or otherwise.

Referring to FIG. 23, often the player 2200 includes a multitude of settings from which the user may select to provide an optimum rendering of the video content in a manner most suitable for the particular viewer.

By way of example, the settings may include rendering settings 2300, such as for example, video resolution, transparency, border adjustment, wide color gamut, high dynamic range, audio settings (e.g., stereo, surround sound), audio volume, closed captioning, picture mode (e.g., cinema, movie, vivid, dynamic, etc.), sharpness, blacklight, contrast, brightness, color, hue, gamma, tint (green/red), aspect ratio, dynamic contrast, black tone, flesh tone, motion lighting, dot noise reduction, smooth gradation, motion-flow, cine-motion, detail enhancer, edge enhancer, camera angle, trickplay portions of video content, or otherwise.

By way of example, the settings may include networking settings 2310, such as for example, gateway address, IP address, preferred DNS server, alternative DNS server, subnet mask, dynamic host configuration protocol, static IP address, port number, or otherwise.

By way of example, the settings may include system settings 2320, such as for example, preferred language, video standard (e.g, PAL or NTSL), time zone, or otherwise.

The user of the player 2200 may select the desired rendering settings 2300, networking settings 2310, and/or system settings 2320 in a manner to suitably display the video content in a manner. In some cases, the user may save a particular arrangements of settings on the player 2200, and retrieve those settings to be applied when viewing the current video content, as desired. However, it tends to be burdensome to reconfigure the device on a regular basis which degrades from the user experience.

Figure 24:
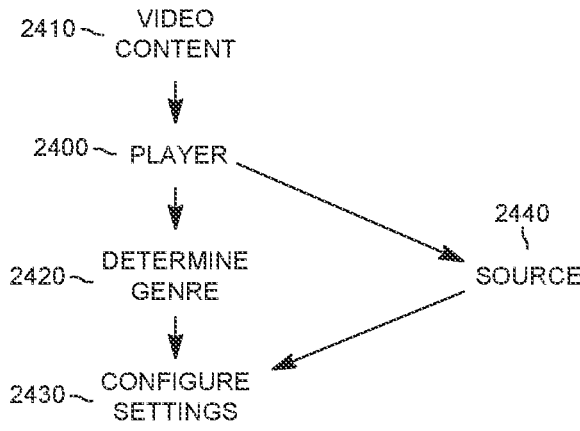
FIG. 24 illustrates a player determining genre and source of video content to configure settings.

Referring to FIG. 24, rather than the user selecting a series of particular settings on a periodic basis, or otherwise loading a set of particular settings when changes are desired, it is preferable to automatically, or in an assisted manner, to change the settings based upon the nature of the video content 2410 that the player 2400 is receiving. By way of example, the nature of the video content 2410 may be the genre 2420 of the video content. For example, the player 2400 may determine the genre 2420 of the video content 2410, such as based upon the meta-data or other data source. The genre 2420, may be for example one or more of, comedy, documentary, drama, horror, music, sports, thrillers, or otherwise. Other genres may be included, as desired. Based upon the genre 2420 of the video content 2410, the player 2400 configures 2430 the rendering settings, networking settings, and/or system settings.

By way of example, the nature of the video content 2410 may be the source 2440 of the video content. For example, the player 2400 may determine the source 2440 of the video content 2410, such as based upon the meta-data, the IP/URL/URI address of the source, or other data source. The source 2440, may be for example one or more of, YouTube, Netflix, Hulu, VLOG, or otherwise. Other sources may be included, as desired. Based upon the source 2440 of the video content 2410, the player 2400 configures 2430 the rendering settings, networking settings, and/or system settings.

The configuration of the settings 2430 may be based upon a configuration selected by the user for a particular genre 2420 and/or source 2440. While such configurations may be manually configured ahead of time by the user, this is a burdensome task for the user to configure.

Figure 25:
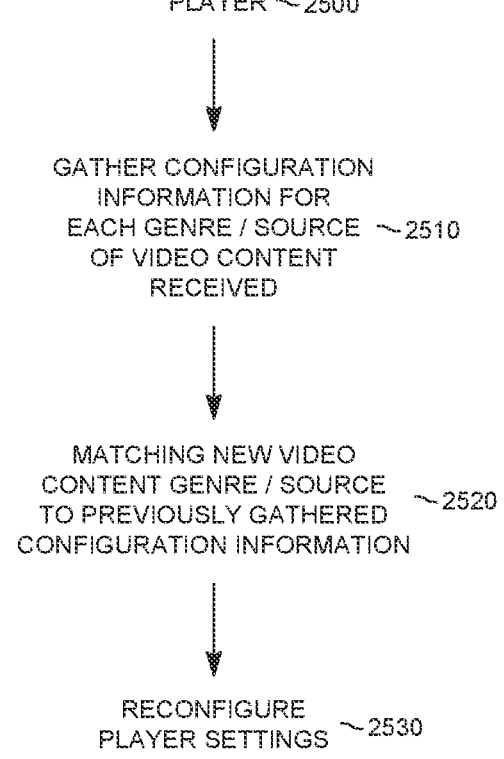
FIG. 25 illustrates a player reconfiguring settings.

Referring to FIG. 25, to reduce the burden on the user, the player 2500 preferably gathers the configuration information based upon the current settings for each genre and/or source 2510 for video content received by the player 2500. In this manner, when the player 2500 encounters different video content that includes a matching (or sufficiently matching) genre and/or source 2520, the player 2500 may be automatically or semi-automatically reconfigured to the same configuration that was previously selected 2530. For example, if the player is receiving new video content with a genre of "Sports" from "ESPN", then the player 2500 may configure its rendering settings, networking settings, and/or system settings to what was previously selected for the same combination of "Sports" and/or "ESPN". In this manner, as the player switches between different video content, the player reconfigures the configuration settings to correspond to what was previously selected. In other cases, when the player receives different video content, it may prompt the user as to whether to change the configuration settings to what was previously used. If desired, the player may then change the configuration settings, or otherwise if not desired may leave the configuration settings as they currently exist.

In another embodiment, the player may save the configuration settings that the user applied for particular video content, even among the same genre and/or source. In this manner, when the same video content is received again, the player may automatically or semi-automatically configure the settings to what was previously applied.

Figure 26:
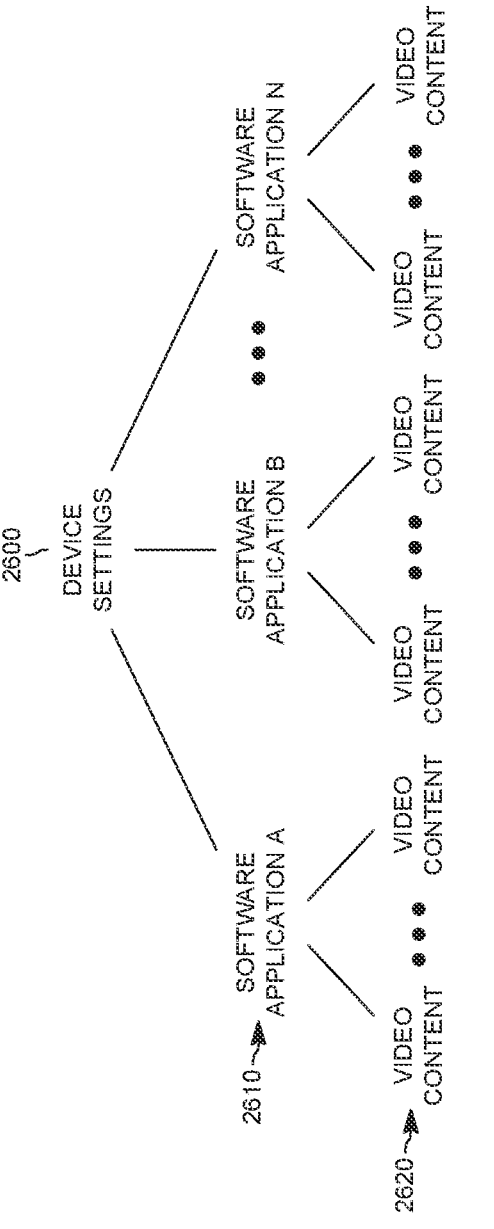
FIG. 26 illustrates a hierarchical configuration.

Referring to FIG. 26, in another embodiment the player may determine and apply the settings in a hierarchical manner. For example, the highest setting(s) for the player may be device settings related to the hardware characteristics of the device. For example, the middle setting(s) for the player may be software applications 2610 (alone or in combination with other devices) that include software settings, either on a mobile device or a hardware device, that may be configured. For example, the lowest settings for the player may be characteristics of the video content 2620, such as genre. In this manner, each configuration of the device settings may include various different combinations of software applications and video content characteristics. In this manner, each configuration of the application settings may include various combinations of video content characteristics. Accordingly, when different previously unprofiled video content characteristics are received, the software applications and the device settings may be selected based upon the hierarchy which are used to tentatively determine suitable video content characteristics. Accordingly, when different previously unprofiled software applications are determined, the device settings may be selected based upon the hierarchy which is then used to tentatively determine suitable software application configuration and/or video content characteristics.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for modifying a video stream comprising:

(a) a player receiving a video stream in the form of a series of video files from a video server interconnected across a network, wherein said series of video files are available in both a high quality format and a low quality format;

(b) said player receiving meta-data from a meta-data source interconnected across said network comprising textual data, where said textual data is not graphical, corresponding to graphical textual information included within graphical image content of frames of the video content in said video stream, where said graphical textual information is derived based upon analysis of said graphical image content of frames of the video content in said video stream, where said graphical textual information included within the graphical image content of frames is the same as the textual data;

(c) when said player selects said video files in said low quality format to display, said player selectively renders said video content of said video stream from said series of video files and said player also rendering said textual data on said video content as graphical content representative of said textual data when said corresponding graphical textual information occurs in said video stream, wherein said rendered said textual data is overlaid on said video content at a location corresponding with said graphical textual information of said video stream so that said textual data is easier to read.

2. The method of claim 1 wherein said meta-data is provided along with said series of video files.

3. The method of claim 1 wherein said meta-data is provided within said series of video files.

4. The method of claim 1 wherein said meta-data is provided separate from said series of video files.

5. The method of claim 1 wherein said meta-data is selectively received by said player based upon receiving a selection from a user.

6. The method of claim 1 wherein said meta-data is selectively received by said player based upon sufficiently blurry said graphical textual information corresponding in said video stream.

7. The method of claim 1 wherein said meta-data indicates where within said video stream to said render said textual data.

* * * * *